UNITED STATES PATENT OFFICE.

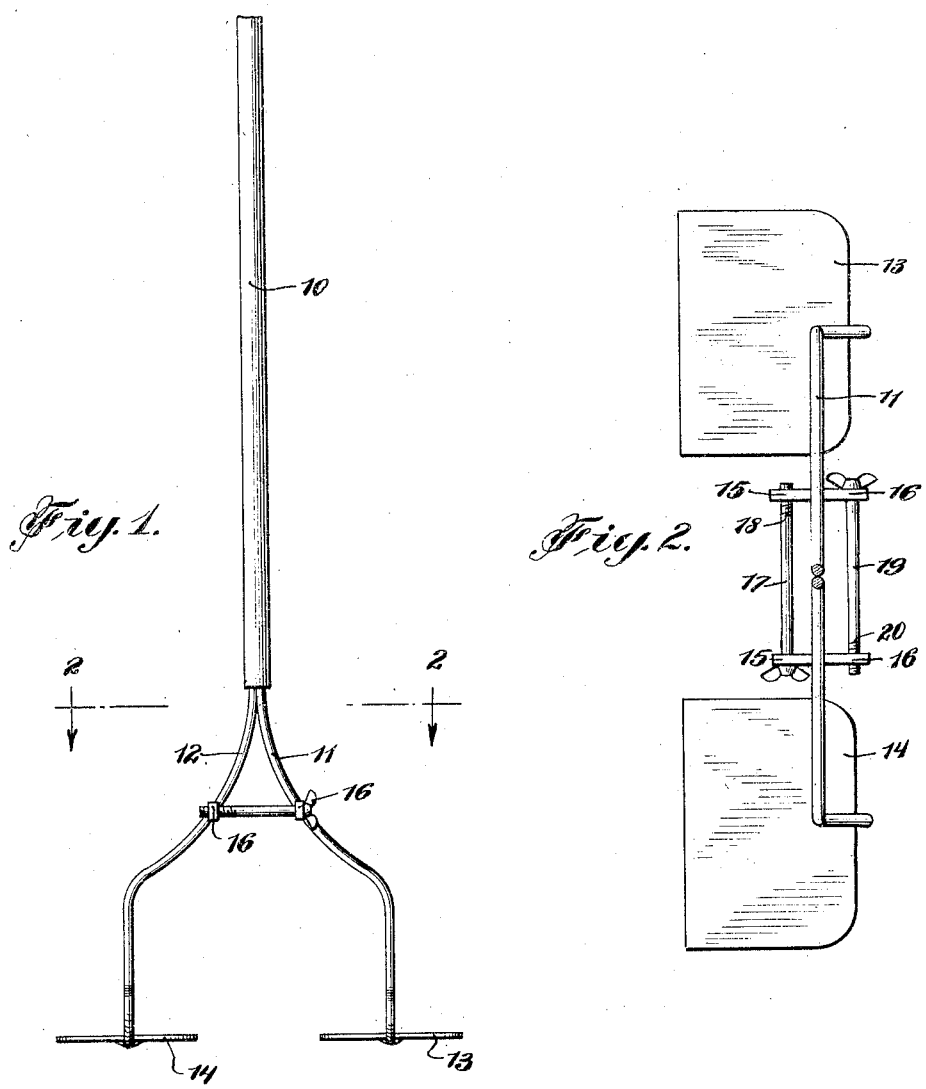

JOHN W. WOOD, OF COVINGTON, TENNESSEE.

HOE.

1,374,795.  Specification of Letters Patent.  Patented Apr. 12, 1921.

Application filed December 23, 1919. Serial No. 346,895.

*To all whom it may concern:*

Be it known that I, JOHN W. WOOD, a citizen of the United States, residing at Covington, in the county of Tipton and State of Tennessee, have invented new and useful Improvements in Hoes, of which the following is a specification.

This invention comprehends the provision of a double bladed hoe, or the like, by means of which a person can accomplish twice as much work in a given time, as compared with a single bladed hoe, means being provided to effect an adjustment between the blades so as to regulate or adjust the space between the blades as the occasion may require.

The nature and advantages of the invention will be better understood when the following detailed description is taken in connection with the accompanying drawings, the invention residing in the construction, combination and arrangement of parts as claimed.

In the drawings, forming part of this specification, like numerals of reference indicate similar parts in the several views; and wherein:—

Figure 1 illustrates a hoe constructed in accordance with my invention.

Fig. 2 is a transverse sectional view on the line 2—2 of Fig. 1.

Referring to the drawing in detail, 10 indicates the handle of the hoe with which the shanks 11 and 12 of the respective blades 13 and 14 are connected. The shanks are spaced apart an appreciable distance as illustrated, but are connected to effect an adjustment between the blades, so that the space or opening between the blades can be regulated as required. The hoes are preferably used in chopping grass out of cotton when the plant is small, and by reason of the duplex construction, it is apparent that twice as much work can be accomplished as with a single bladed hoe. It might here be stated that the hoe blades may vary in size, that is to say that the work of the cutting edges of the hoe blades may be varied.

While any suitable means may be resorted to for effecting an adjustment between the hoe blades, I have shown in this specific instance, a pair of lugs 15 and 16 projecting above and below each shank of the hoe as shown. The lug 15 of the shank 11 is threaded, while the lug 15 of the shank 12 is provided with a smooth opening to slidably receive the non-threaded portion of the adjusting bolt 17, which has a threaded portion 18 received by the threaded lug 15 of the shank 11. The lug 16 depending from the shank 11 is similar to the lug 15 of the shank 12, that is to say that it is provided with a smooth opening for the reception of the smooth portion of the adjusting element 19, while the lug 16 of the shank 12 is threaded to adjustably accommodate the threaded portion 20 of the adjusting element 19. In this manner, the adjusting elements 17 and 19 respectively may be adjusted to vary or regulate the distance between the hoe blades 13 and 14 as the occasion requires.

While I have shown and described what I consider the preferred embodiment of the invention, I desire to have it understood that I do not limit myself in this connection in that such changes may be resorted to when desired as fall within the scope of what is claimed.

Having thus described my invention what I claim as new is:—

1. A double bladed hoe comprising a shank for each blade of the hoe, a handle supported by said shanks, said shanks being spaced to space the blades, apertured lugs carried by said shanks, said lugs being arranged in parallelism and projecting beyond the opposite sides of the respective shanks, and adjustable connecting elements associated with said lugs and arranged at opposite sides of the shanks to reinforce the latter.

2. A double bladed hoe comprising a shank for each blade, a handle supported by said shanks, said shanks being spaced to space the blades, apertured lugs projecting from said shanks, and arranged parallel with said blades, adjustable elements arranged at opposite sides of said shanks, and connected with said lugs, this element having a threaded portion, and a non-threaded portion, the threaded portion being fitted into the opening of one lug, while the non-threaded portion is slidably associated with the other lug, whereby said elements are reversely disposed.

3. A double bladed hoe comprising a shank for each blade, a handle supported by said shanks, said shanks being spaced to space said blades, apertured lugs projecting from said shanks and beyond the opposite sides thereof, each lug having spaced openings, one of said openings being threaded, adjustable elements arranged at opposite sides of the shanks for connecting said lugs, each of said adjustable elements having a non-threaded portion, and a threaded portion, said elements having their threaded portions reversely disposed and threaded into said threaded openings of the respective openings of the respective lugs, the non-threaded portion being loosely passed through the other openings of the respective lugs as and for the purpose specified.

In testimony whereof I affix my signature.

JOHN W. WOOD.